G. W. DUNNE.
METHOD OF FORMING MULTICRANK SHAFT BLANKS.
APPLICATION FILED DEC. 4, 1916.
1,252,673.
Patented Jan. 8, 1918.
6 SHEETS—SHEET 1.
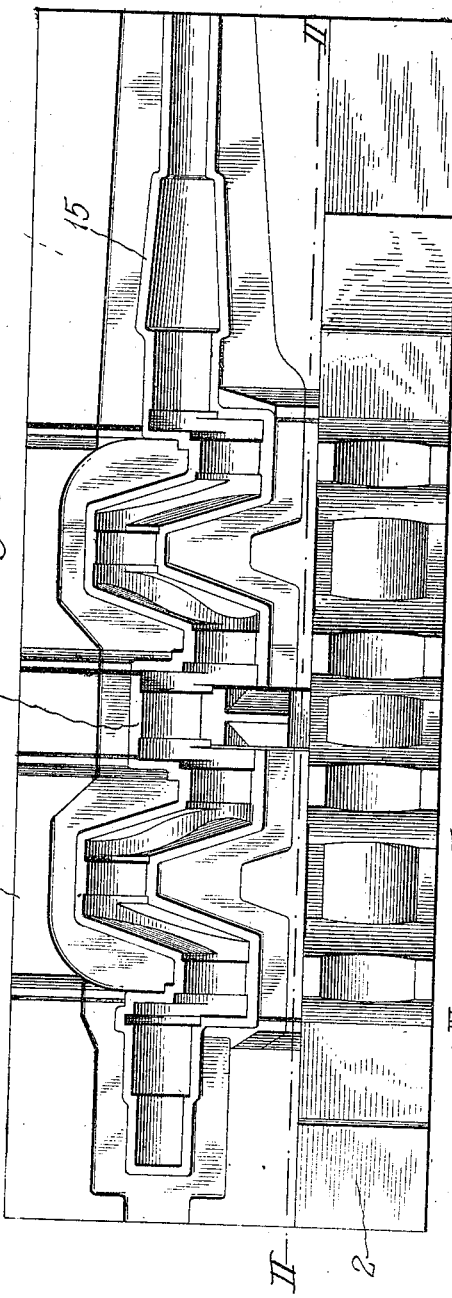
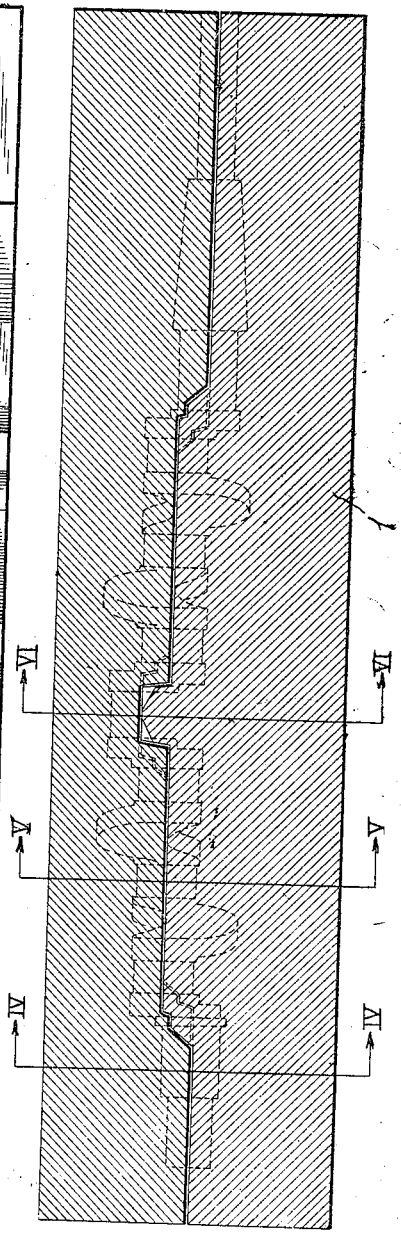

G. W. DUNNE.
METHOD OF FORMING MULTICRANK SHAFT BLANKS.
APPLICATION FILED DEC. 4, 1916.
1,252,673.
Patented Jan. 8, 1918.
6 SHEETS—SHEET 2.
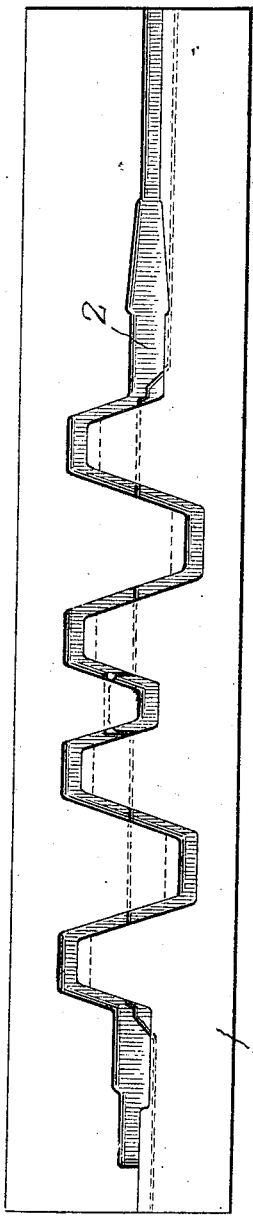
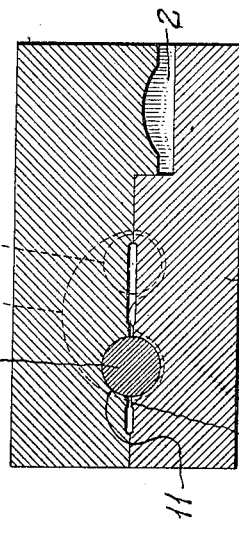
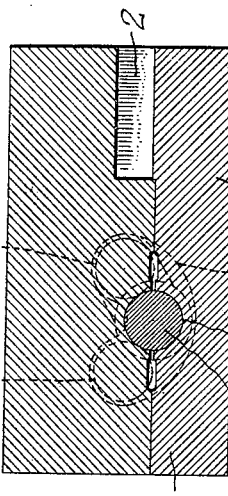
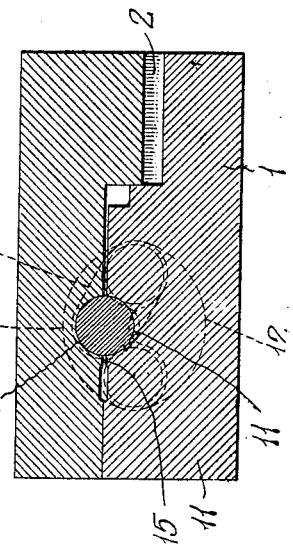
Witness
Chas. W. Stauffiger
Karl N. Butler
Inventor
George W. Dunne,
By
Attorneys

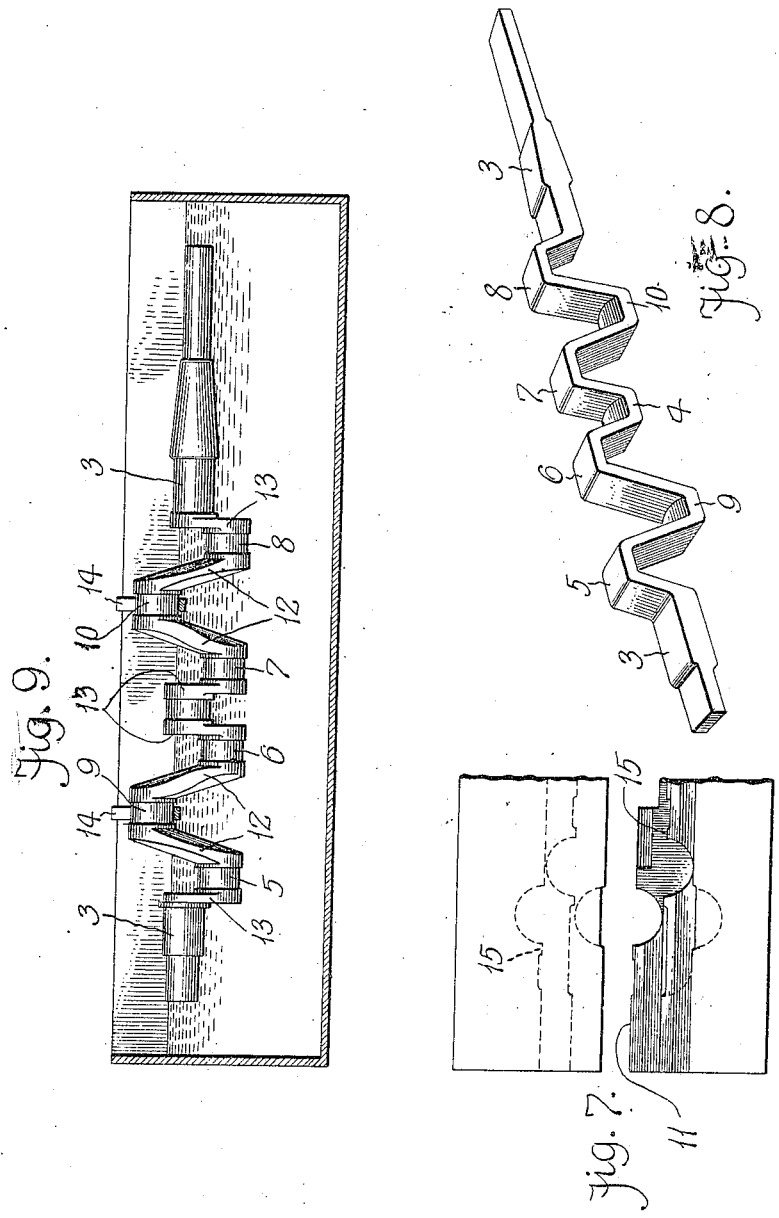

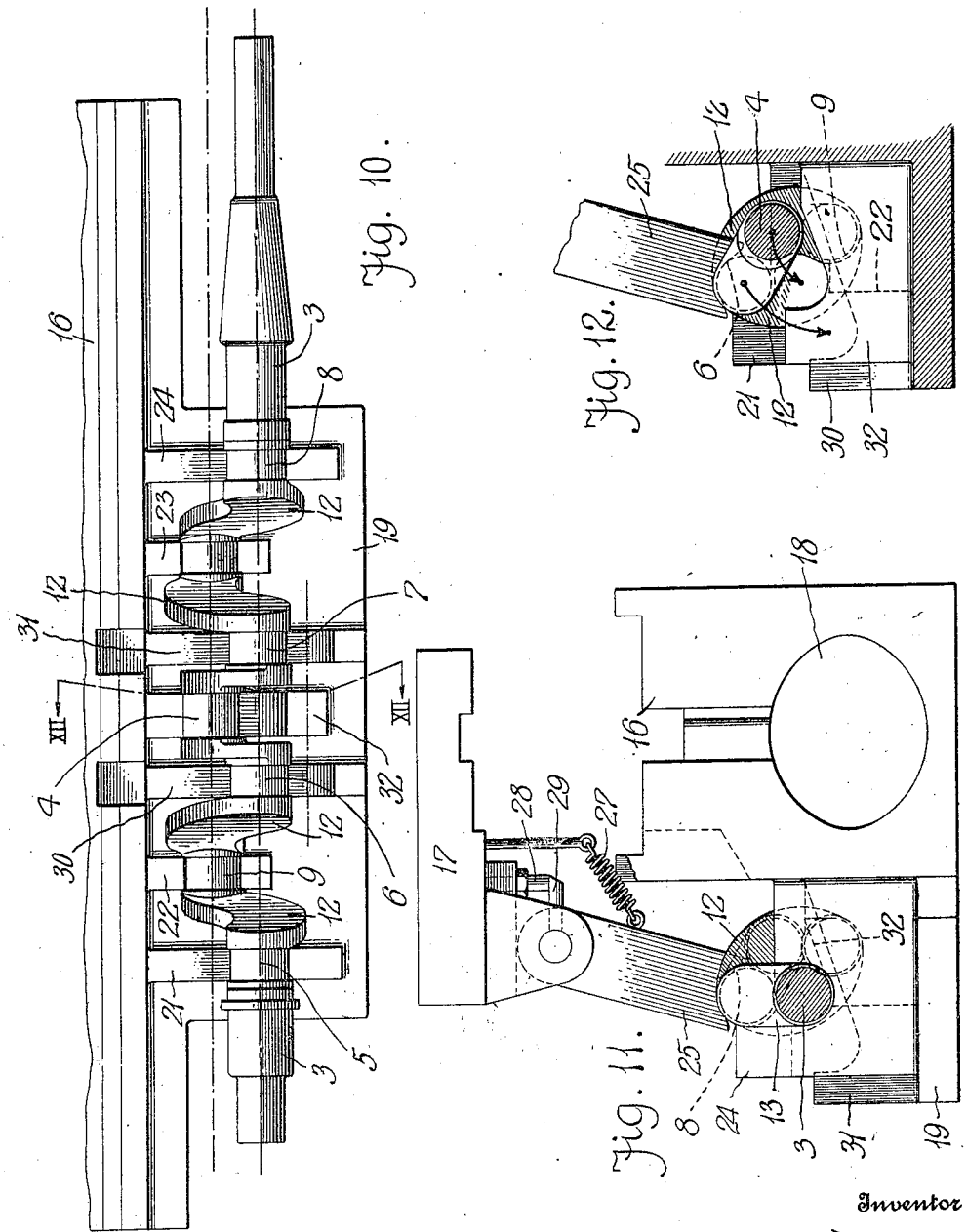

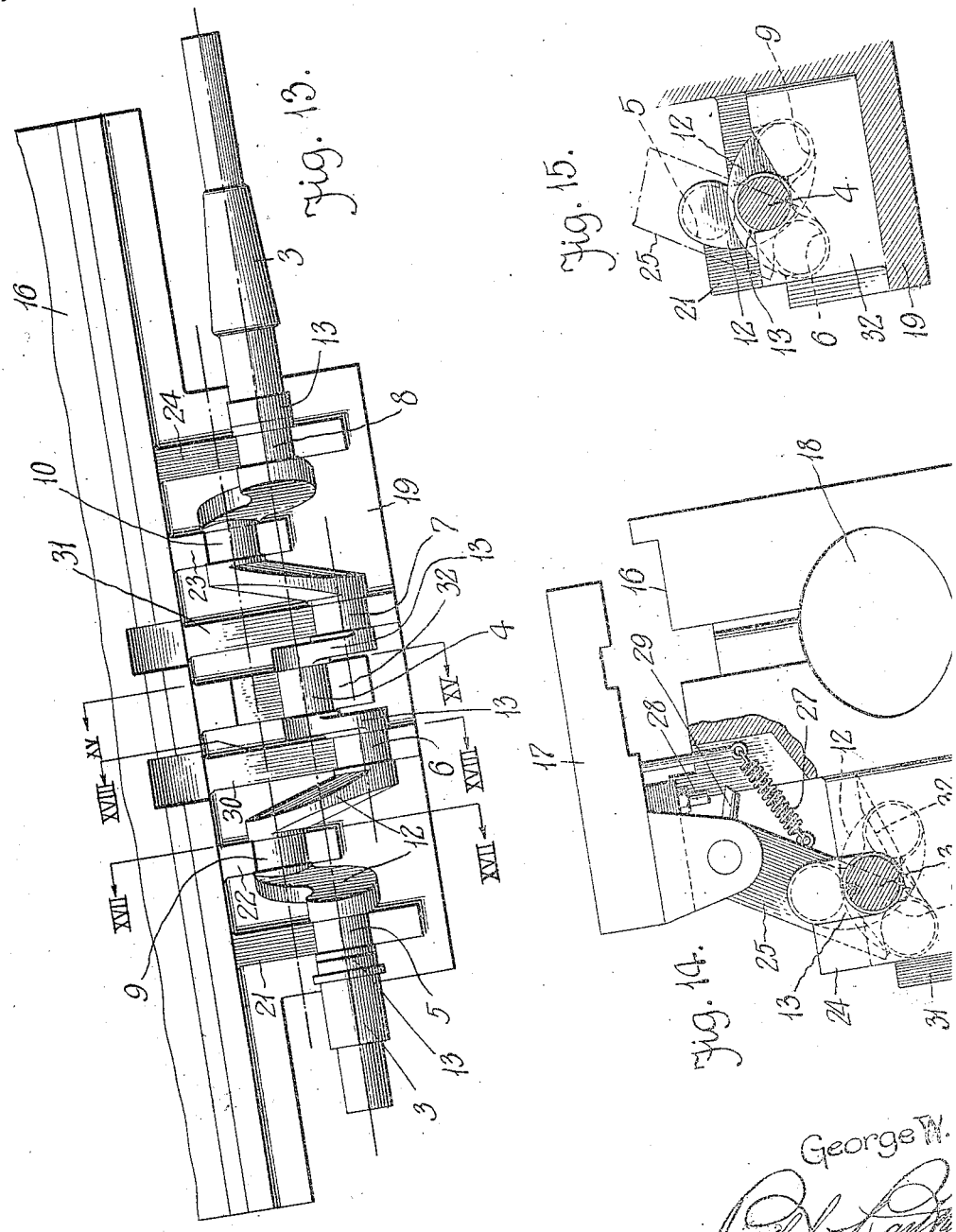

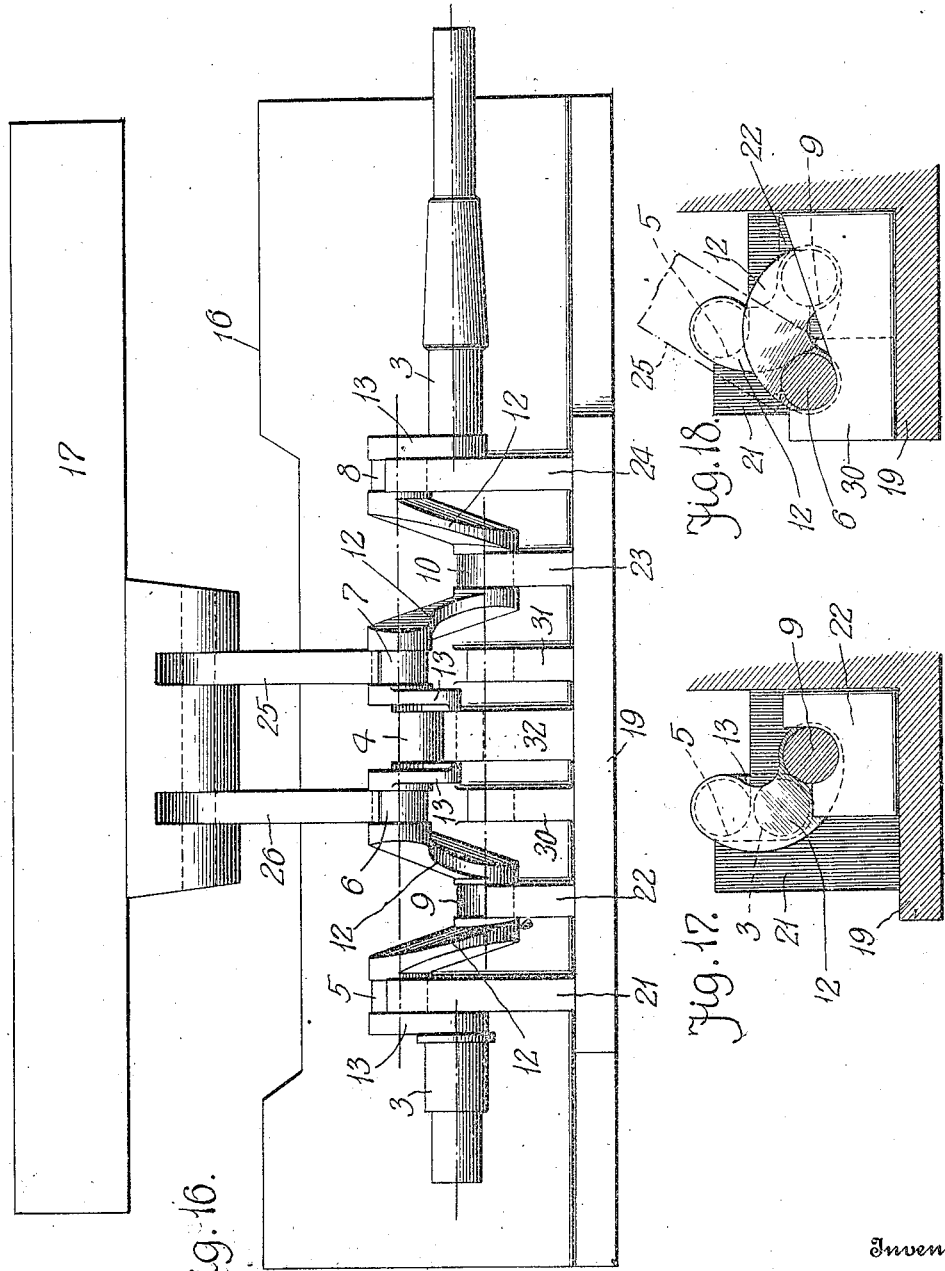

UNITED STATES PATENT OFFICE.

GEORGE W. DUNNE, OF MUSKEGON, MICHIGAN.

METHOD OF FORMING MULTICRANK-SHAFT BLANKS.

1,252,673.

Specification of Letters Patent.  Patented Jan. 8, 1918.

Application filed December 4, 1916. Serial No. 134,807.

*To all whom it may concern:*

Be it known that I, GEORGE W. DUNNE, a citizen of the United States of America, residing at Muskegon, in the county of Muskegon and State of Michigan, have invented certain new and useful Improvements in Methods of Forming Multicrank-Shaft Blanks, of which the following is a specification, reference being had therein to the accompanying drawings.

This invention relates to a method of forming multicrank shaft blanks from stock in such a manner as to minimize the number of steps, to insure accuracy in the blanks so that there is very little difficulty in centering and machining them and in carrying out the shaping of the blanks in such a manner as to avoid cold shuts and undue strain.

The invention consists in the matters hereinafter set forth, and more particularly pointed out in the appended claims.

In the drawings;

Figure 1 is a plan view of the lower half of bed block of a die employed in carrying out the process;

Fig. 2 is a view in longitudinal vertical section therethrough taken on or about on line II—II of Fig. 1;

Fig. 3 is a view in side elevation of the die looking toward the portion that is used in forming the first offsets in the blank;

Figs. 4, 5 and 6 are views in detail in cross section taken on or about on line IV—IV, line V—V and line VI—VI, respectively of Fig. 2;

Fig. 7 is a view in end elevation of the bottom or bed block and companion head die showing in dotted lines the elevation contour thereof;

Fig. 8 is a view of a blank that has passed through the initial offsetting operation;

Fig. 9 is a view showing a method of quenching and cooling a portion of the partially formed shaft;

Fig. 10 is a plan view showing the disposition of the blank in a bending die;

Fig. 11 is a view in side elevation of a flashing die and the bending die, shown partially in Fig. 10;

Fig. 12 is a view showing the position assumed by the parts taken on the line XII—XII of Fig. 10;

Fig. 13 is a plan view of the bending die and the form assumed by the blank after the bending operation;

Fig. 14 is an end view showing the upper part or bending and flashing heads in the position assumed at the end of the bending stroke;

Fig. 15 is a view in section taken on or about on line XV—XV of Fig. 13;

Fig. 16 is a view in side elevation showing the blank in the bending die as indicated in Fig. 13 with the engaging bending head as in the position shown in Fig. 11;

Figs. 17 and 18 are views in section through the blank on lines XVII—XVII and XVIII—XVIII of Fig. 13.

Referring to the drawings a bed plate 1 of a die for a steam hammer or the like, is provided with a formed recess for obtaining the desired result, that is, a multi-throw crank shaft blank having crank pins interconnected to journal portions by short arms and to each other by longer arms or cheeks, the arms and cheeks being in planes radial to the blank axis and in angular relation to each other. The longitudinal profile of the offsetting portion indicated at 2, is such that when the bar of stock, in heated condition, is placed upon this portion and a companion or complemental header or presser block is forced down upon it by a steam hammer or other suitable means, the blank assumes the form indicated in Fig. 8, with end journal portions 3 in alinement, an intermediate journal portion 4 and with crank pin portions 5, 6, 7 and 8 on the opposite side of the main axis of the bar to corresponding crank pin portions 9 and 10. In order to provide suitable metal, it is desirable also that the cross sectional contour indicated in the parts 9, 10 and 4, and of course in the crank pin parts 5, 6, 7, and 8, be effected by proper dress of the dies.

Another portion indicated at 11 of the die block or bed 1, is recessed and dressed to receive the blank indicated in Fig. 8 after it leaves the offsetting portion and when coöperating with a corresponding part of the die head or presser block, it is arranged to bring the blank to the form shown in Fig. 9, for example, with the long crank arm portions 12 uniting the parts 5, 6, 7 and 8 to the parts 9 and 10 and shorter crank arms 13 connecting these first named parts with the journal parts 3 and 4, all of substantially the desired kidney shape or cheek form that constitutes good mechanical design in a device of this character.

Furthermore, the parts 5, 6, 7 and 8 are now in a plane radial to the longitudinal axis of the blanks, that is, in a predetermined angular relation to a radial plane in which the portions 9 and 10 now lie, that is, at 120 degrees from each other and both apart from the plane of the central axis of the blank.

The blank which is still heated and at good working temperature, is then brought into a cooling tank as indicated at Fig. 9 with the intermediate crank pin portions 9 and 10 caught by suitable hangers 14 so as to be above the level of the cooling medium in which the rest of the shaft is immersed.

If, however, the portion of the die indicated by the recess, has produced a flash along the parting line of the dies, and such is provided for by the flash line indicated at 15 (Fig. 1) and a corresponding gutter in the upper companion part of the die, it is necessary to force the blank through a flashing die which of course has the outline or contour of the blank at the parting line of the die. Such a flashing die is indicated in end elevation at 16 of Fig. 16, and it is to be understood that it has such a contour and that the cutter members which are disposed as usual in shearing dies of this type, are carried by the header or ram 17 of a steam hammer or like means. After the blank is pushed through the flashing die it is withdrawn longitudinally through the opening 18 which is so disposed as to permit of ready endwise movement from the die.

After removal from the tank as indicated in Fig. 9, the intermediate crank pin parts 9 and 10 are still heated and therefore are bendable or twistable without danger of disruption. The partly quenched blank is placed on a bending tool 19 which may be readily mounted at the side of the flashing die 10, in such a position that the portions 3, 5, 8, 9, and 10 of the blank are firmly supported on fingers or stops 21, 22, 23 and 24, while the crank pin portions 6 and 7 and the central crank pin 4 are unsupported.

The head 17 carries depending hinged or pivotally mounted fingers 25 and 26 that are normally held in oblique relation to the header stroke as by means of springs 27 and coöperating stops 28 and 29 so that when they are brought into contact with the portions 6 and 7 of the blank, by the downward motion of the header or presser, they swing outwardly as the blank continues its downstroke. Because of the support afforded the other parts, the crank pins 6 and 7 swing on the hot pins 9 and 10 as pivots with the cheeks 12 as radii, and at the completion of the stroke when the parts 6 and 7 are brought to rest against suitable stop portions 30 and 31 of the die, the center pin 4 has moved into axial alinement with the portions 3, as seen in Fig. 12 against the stop 32.

When the blank is withdrawn from the die it is in substantially proper condition for machining with the possible exception of straightening, and this may be effected in the usual manner by a straightening die that has the proper parting line to receive the blank at this stage and bring it to more accurate alinement than the previous steps of the process may have been capable of producing. That is, the straightening die is used to correct minor deviations due to the warping or twisting under effect of the heat.

As a result of this process a multi-throw crank shaft is produced very expeditiously in such manner as to have no waste of stock, no additional stock necessary as is common in ordinary forging operations because of deviations from the turning axes, and no danger of cold shuts as there are no corners to be formed by upsetting of the shaft by endwise displacement. Only one heat is found necessary for carrying out this process, and if properly finished, the flashing die may be at times omitted, the amount of flash of course, depending upon the wear of the other dies and the amount of metal that is present in the blank before treatment.

Obviously, changes in the details of construction may be made without departing from the spirit of my invention and I do not care to limit myself to any particular form or arrangement of parts within the scope of the appended claims.

What I claim is:—

1. A method of forging multi-throw crank-shafts that consists in first forming oppositely disposed offsets in a previously heated bar that lie in a plane of the longitudinal axis of the bar, in moving some of the offsets into another plane passing through the bar axis, and simultaneously therewith shaping the parts, in chilling all but certain crank pin portions of the blank, and in swinging certain crank pin portions on the still heated crank pin portions as an axis of motion into a plane radial substantially to the shaft axis and symmetrical angularly to the radial planes of the other portion.

2. A method of forging multi-throw crank shafts having crank arms in angular relation that consists in stamping a heated blank into form with the crank pin portions lying in two planes radial to the blank axis, in then chilling the blank with the exception of certain crank pin portions, and in swinging those portions connected to the still heated portions and which are not in final position, on the heated parts as pivots into desired angular relation to the remainder of the crank shaft.

3. A method of forging multi-throw crank-shafts having crank arms and pins in different planes radial to the shaft axis, which consists in forming offsets in a stock bar which lie in a single radial plane to provide both single and double-throw crank arms, in reducing the offset blank to substantially desired contour with certain of the offset portions in one radial plane and others in a second radial plane in predetermined angular relation to the first, in cooling the blank, all but certain crank pin portions in one of these planes, and in throwing certain other of the crank pin portions and arms connecting them to the still heated crank pins into a plane having symmetrical angular relation with the other planes by turning them on the still heated portions as an axis.

4. A method of forging multi-throw crank shafts that consists in stamping a heated blank into form with certain pin portions out of position, in then chilling the blank with the exception of certain crank pin parts to which those parts that are out of position are connected, and in then swinging the latter portions on the still heated crank pin parts as pivots into the desired angular relation to the remainder of the crank shaft.

5. A method of forging multi-throw crank shafts that consists in stamping a heated blank into form with certain crank-pin portions thereof out of position, in then chilling the blank with the exception of certain crank pin parts to which those parts that are out of position are connected, in then swinging the latter portions on the still heated crank pin parts as pivots into the desired angular relation to the remainder of the crank shaft and in then submitting the blank to a straightening die and adapted to act on and to bring the entire blank into accurate alinement.

In testimony whereof I affix my signature in the presence of two witnesses.

GEORGE W. DUNNE.

Witnesses:
WILLARD G. TURNER, Jr.,
HARRIS E. GALPIN.